I. B. KOONS.
AUTOMOBILE PEDAL LOCK.
APPLICATION FILED MAR. 8, 1921.

1,408,357.

Patented Feb. 28, 1922.

Isaac B. Koons
INVENTOR

BY Victor J. Evans
ATTORNEY

Paul M. Hunt

WITNESS:

UNITED STATES PATENT OFFICE.

ISAAC B. KOONS, OF BATH, PENNSYLVANIA.

AUTOMOBILE PEDAL LOCK.

1,408,357.  Specification of Letters Patent.  Patented Feb. 28, 1922.

Application filed March 8, 1921. Serial No. 450,555.

*To all whom it may concern:*

Be it known that I, ISAAC B. KOONS, a citizen of United States, residing at Bath, in the county of Northampton and State of Pennsylvania, have invented new and useful Improvements in Automobile Pedal Locks, of which the following is a specification.

This invention relates to theft preventing devices for automobiles and has for its object the provision of a simple device for locking the clutch and reverse pedals of a Ford automobile against movement so that the machine cannot be operated under its own power, the device, however, not in any way affecting either the foot brake or the hand brake so that in case of fire or other emergency the machine might be pushed from place to place.

An important object is the provision of a device of this character which is formed as a single bar suitably shaped and adapted to be locked immediately above the floor boards and in engagement with the clutch and reverse pedals.

An additional object is the provision of a device of this character which will be very simple and inexpensive in construction, highly efficient in use, durable in service, and a general improvement in the art.

With the above and other objects and advantages in view, the invention consists in the details of construction to be hereinafter more fully described and claimed and illustrated in the accompanying drawings in which—

Figure 1:
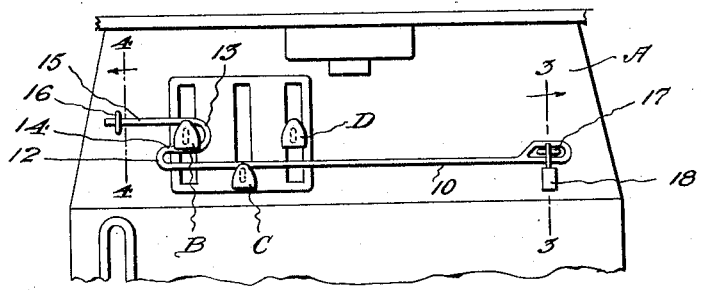
Figure 1 is a plan view of my device showing it in operative position.
Figure 2:
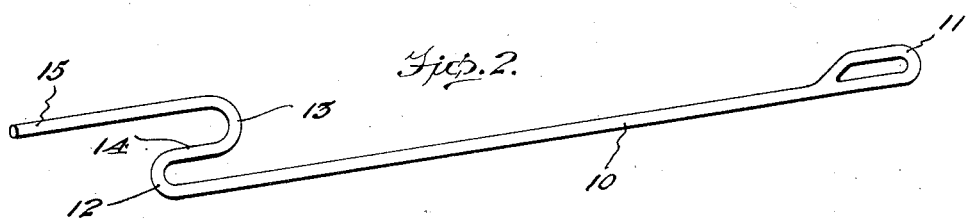
Figure 2 is a perspective view of the locking member detached.
Figure 3:
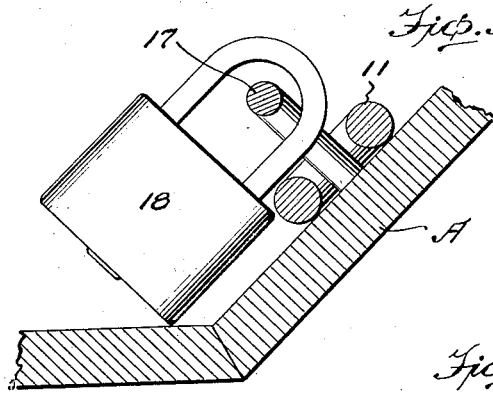
Figure 3 is a cross sectional view on the line 3—3 of Figure 1.
Figure 4:
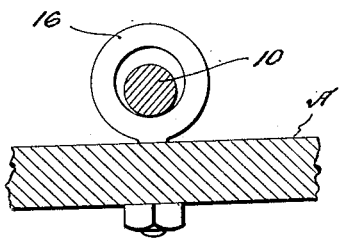
Figure 4 is a cross sectional view on the line 4—4 of Figure 1.

Referring more particularly to the drawings, the letter A designates the floor of a Ford automobile and B, C and D designate, respectively, the clutch, reverse and brake pedals. In carrying out my invention I provide a locking device which comprises a single bar 10 which is formed at one end with an elongated loop 11. In actual practice this loop would be formed by bending the bar upon itself, and welding the free end to the body portion. Intermediate its ends this bar is bent, as indicated at 12, and is then rebent, as shown at 13, to define spaced arms 14, and 15, the latter of which is relatively long. Secured by some suitable means upon the floor A at a point spaced from the clutch pedal B, is a staple shaped bracket 16 and secured on the floor at the opposite edge thereof is an upstanding staple member 17.

In applying my device to locking pedals, the bar is so placed that the arms 14 and 15 will straddle the shank of the clutch pedal B with the body portion of the bar extending between the clutch pedal and the reverse pedal. The bar is moved longitudinally to bring the arm 15 through the bracket 16 and the bar is then moved downwardly into engagement with the floor with the loop 11 engaging over the staple member 17. The device is locked in this position by means of a padlock 18, the shank of which is engaged through the staple 17 above the loop 11. It will be seen that it is then impossible to move the clutch pedal B forwardly so that the machine cannot be placed in high or low gear and it will be likewise apparent that the reverse pedal C cannot be moved forwardly. It is to be noted, however, that the brake is unaffected so that the machine may be pushed from place to place in case of emergency.

Figure 5:
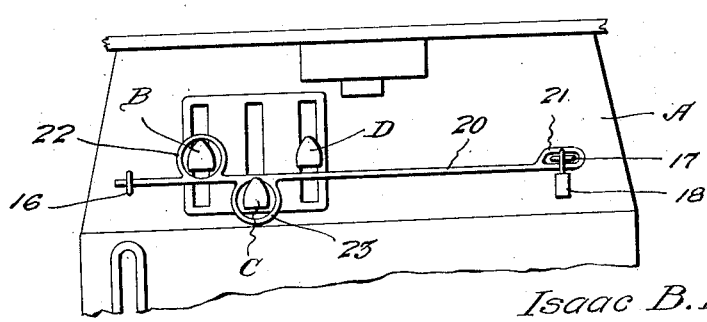
Figure 5 is a view similar to Figure 1 showing a modified form.

In the form shown in Figure 5 the bar 20 is formed at one end with a loop 21 and is formed intermediate its ends with loops 22 and 23 engageable about the clutch pedal B and reverse pedal C. In this form the device is locked in exactly the same way as in the previously described form and the function and operation are identically the same.

From the foregoing description and a study of the drawings it will be apparent that I have thus provided a very simply constructed and consequently inexpensive locking device for the pedals of automobiles which will prevent operation of the machine under its own power and which will therefore eliminate danger of theft.

While I have shown and described the preferred embodiments of my invention, it is of course to be understood that I reserve the right to make such changes in the form, construction, and arrangement of parts as will not depart from the spirit of the invention or the scope of the subjoined claim.

Having thus described my invention, I claim:

A locking device for the pedals of an automobile comprising an elongated bar formed at one end with a loop and bent and rebent at its other end to define spaced arms, a bracket secured upon the floor of the automobile and through which one of said arms may be inserted subsequent to the engagement of the arms in straddling relation to the clutch pedal, the major portion of the bar extending between the clutch pedal and the reverse pedal in engagement with the latter, and a staple member extending upwardly from the floor of the automobile and passing through said loop, the staple member being adapted for engagement by the shackle of a padlock.

In testimony whereof I affix my signature.

ISAAC B. KOONS.